Patented Oct. 21, 1941

2,260,239

UNITED STATES PATENT OFFICE 2,260,239

MANUFACTURE OF MELAMINE-ALDEHYDE CONDENSATION PRODUCTS

William F. Talbot, Framingham, Mass., assignor, by mesne assignments, to Monsanto Chemical Company, a corporation of Delaware No Drawing. Application December 12, 1936, Serial No. 115,632

18 Claims. (Cl. 260—72)

I have discovered that melamine may be reacted and condensed with certain aldehydes and possibly with other substances to produce condensation products which have properties or a combination of properties not possessed by other condensation products. The structure of melamine is probably correctly indicated by the following formula:

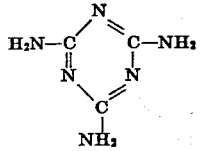

So far I have been able to produce resinous materials by reacting melamine either with formaldehyde or with normal butyraldehyde or crotonaldehyde. It is theoretically possible to condense other aldehydes, such as acetaldehyde, furfuraldehyde, and benzaldehyde, with melamine. The condensation products made with melamine as a base may be produced in such a way as to be water soluble in all stages of condensation except the final stage. This water solubility is an extremely valuable property of my melamine condensation products. Since these condensation products, during certain stages of condensation and under proper conditions, remain in solution in water, the solution may be applied as a lacquer and subsequently rendered water insoluble by heating. While these partial condensation products may be rendered water insoluble by heating, they may also be rendered so by acidification. These melamine condensation products are transparent, water-white, resistant to actinic light, unusually hard, quite shock resistant and they may be cast. If the condensation is stopped at an intermediate stage, materials are obtainable which are solid and are fusible and thermosetting and may be molded under heat and pressure to produce transparent non-fusible products.

In the practice of the invention melamine and the aldehyde are mixed in a liquid medium, usually water, and in desired proportions. This mixture is subjected to gentle heating until the melamine is dissolved and the initial condensation product formed. The reaction may proceed either with or without an added acid or alkaline catalyst. When the reaction is properly controlled, the product of the initial condensation is a clear solution in the water or other liquid medium used.

The solution of the initial condensation product may be poured into a liquid in which the water, or other liquid medium used, is miscible and in which the initial condensation product is not miscible. If the liquid medium in which the initial condensation product is formed is water the initial condensation product may be precipitated as a solid by pouring the solution into anhydrous methyl alcohol. Alternatively, the water may be removed by spray drying. The solid precipitate at this stage is fusible and may be molded under heat and pressure with or without the addition of fillers to produce a non-fusible product.

In general, it is preferred to use a catalyst to assist or control the reaction. When melamine is condensed with formaldehyde, an acid catalyst appears to hasten the reaction while an alkaline catalyst retards the reaction. In general, the quantity of catalyst used is a factor affecting control of the reaction. While either an acid or an alkaline catalyst may be used in the condensation of melamine with formaldehyde, an acid catalyst generally should be used when condensing melamine with the higher aldehydes. Good results have been obtained by reacting melamine and butyraldehyde in glacial acetic acid which served both as the liquid medium and as the catalyst.

The temperature and time of heating also are important factors in the control of the reaction. If the heating of the mixture is prolonged or conducted at too high a temperature the whole mass may set to a gel in the reaction chamber. By heating at too low a temperature a cloudy initial condensation product may be produced which, however, generally can be rendered clear by later heating at a higher temperature. The molecular ratio of melamine to formaldehyde also affects the properties of the product and the control of the reaction. In general, it is preferred to use a molecular ratio of melamine to aldehyde of about one to 4.5 but higher or lower ratios may be used with success. As shown by the examples set forth hereinafter, the ratio of melamine to aldehyde is within the range of 1 mol of melamine to 2.7 to 8.8 mols of aldehyde. The higher ratios tend toward crazing of the finished product while lower ratios lead to initial products soluble in alcohol which is not a characteristic of the products in general.

Example I

| | Grams |
|---|---|
| Melamine | 315 |
| Formaldehyde solution (36% technical) | 745 |
| Ammonium hydroxide solution (10% NH₃) | 25 |

This mixture is heated over a boiling water bath for 30 minutes under a reflux condenser. At the end of this period of heating the melamine is all dissolved and the clear solution is poured into 16 liters of methyl alcohol, whereupon a coarse white precipitate is formed. After separation by filtration, the precipitate is allowed to dry at room temperature, yielding a white, opaque, somewhat rubbery material. This product is fusible and may be holded under heat and pressure to form a hard, tough, colorless, transparent resin.

Example II

For condensation without added catalyst, the following proportions may be used.

| | Grams |
|---|---|
| Melamine | 63 |
| Formaldehyde (36% technical) | 182 |

The above mixture is heated to boiling under a return condenser for 10 minutes, then poured into shallow molds and heated in an oven at 80° C. for 20 hours. The product is a tough, hard, white, translucent resinous material which may be machined, ground, filed and polished.

Example III

A mixture of the following ingredients is boiled under a reflux condenser for 1½ hours.

| | Grams |
|---|---|
| Melamine | 126 |
| Formaldehyde solution (37.5% technical) | 364 |
| Sodium hydroxide solution (10% in water) | 3.5 |

The clear solution resulting from the above condensation may be poured into shallow molds and the water removed by evaporation. Following evaporation of the water the resin may be cured by heating in an oven at 87° C. for 15 hours. The product is colorless, hard, transparent, and only slightly cloudy. The finished slabs or sheets may be polished, ground, or machined, and are useful as substitutes for glass.

Example IV

| | Grams |
|---|---|
| Normal butyraldehyde | 50 |
| Glacial acetic acid | 25 |
| Melamine | 10 |

This mixture is refluxed on a water bath at 80° C. for 5½ hours at which time nearly all the melamine is dissolved and a condensation product formed.

Example V

In order to prepare condensation products of melamine with crotonaldehyde, the following mixture is prepared:

| | Grams |
|---|---|
| Melamine | 100 |
| Water | 230 |
| Hydrochloric acid concentrated (38% HCl) | 12 |
| Crotonaldehyde | 150 |

The above-mentioned mixture is heated over a boiling water bath under return condenser for 2¼ hours at the end of which time all of the melamine is dissolved. When cast in shallow molds, this material sets up, after standing 24 hours at room temperature, to a hard, non-tacky, transparent solid.

I claim:

1. The condensation product of melamine and an aldehyde wherein the melamine and aldehyde are reacted in a molecular ratio within the range of about 1 mol of melamine to not less than 2.7 and not more than 8.8 mols of aldehyde which is fusible and is capable of setting under the influence of heat to a hard, shock resistant, infusible and water insoluble solid.

2. A condensation product comprising melamine and formaldehyde as the essential reactants.

3. The process which comprises reacting a mixture containing melamine and formaldehyde as the essential reactants, until there is produced a melamine-formaldehyde reaction product.

4. A condensation product comprising melamine and an aldehyde as the principal reactants.

5. The process which comprises reacting a mixture containing melamine and an aldehyde as the principal reactants, until there is produced a melamine-aldehyde condensation product.

6. A resinous product comprising the condensation product of melamine and acetaldehyde as the essential reactants.

7. A resinous product comprising the condensation product of melamine and butyraldehyde as the essential reactants.

8. A process which comprises reacting a mixture containing one mol of melamine and not more than 4.5 mols of formaldehyde as essential reactants until there is produced a melamine-formaldehyde reaction product.

9. The process which comprises reacting a mixture containing melamine and an aldehyde as essential reactants, in which the melamine and aldehyde are present in the combining ratio of 1 mol of melamine to 2.7–8.8 mols of aldehyde, until there is produced a melamine-aldehyde reaction product.

10. A water-soluble reaction product comprising melamine and an aldehyde as essential reactants.

11. A water-soluble reaction product comprising melamine and formaldehyde as essential reactants.

12. A thermo-setting resinous material comprising a condensation product of melamine and an aliphatic aldehyde as essential reactants.

13. A thermo-setting resinous material comprising a condensation product of melamine and formaldehyde as essential reactants.

14. A process which comprises reacting in a liquid medium a mixture containing melamine and formaldehyde as essential reactants to form an initial reaction product, removing the liquid medium from the reaction product, and heating the reaction product to produce a non-fusible resinous product.

15. A process which comprises reacting in a liquid medium a mixture containing melamine and an aliphatic aldehyde as essential reactants, removing the liquid medium from the reaction product, and heating the reaction product to produce a non-fusible resinous product.

16. A water-insoluble non-fusible resinous product comprising a hardened reaction product of melamine and an aldehyde as essential reactants.

17. A condensation product of melamine and formaldehyde as the sole reactants.

18. A resinous composition of matter comprising a condensation product of melamine and an aliphatic aldehyde as essential reactants in which the melamine and aliphatic aldehyde are combined in a molecular ratio within the range of about 1 mol of melamine to 2.7–8.8 mols of aliphatic aldehyde.

WILLIAM F. TALBOT.